US007387079B2

(12) United States Patent
Kruse

(10) Patent No.: US 7,387,079 B2
(45) Date of Patent: Jun. 17, 2008

(54) AUTOMATIC HORN SHUTTER

(75) Inventor: William Kruse, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/277,259

(22) Filed: Mar. 23, 2006

(65) Prior Publication Data

US 2007/0221116 A1 Sep. 27, 2007

(51) Int. Cl.
*B60Q 5/00* (2006.01)
*G10K 9/00* (2006.01)

(52) U.S. Cl. ....................... 116/59; 116/24; 116/137 R; 181/185; 340/388.1; 340/404.1

(58) Field of Classification Search .................. 116/59, 116/24, 56, 137 R, 139, 142 R; 340/388.1, 340/388.3, 388.5, 388.7, 388.8, 391.1, 404.1, 340/404.3, 692, 693.5, 387.1; 181/185, 186, 181/144, 148
See application file for complete search history.

(56) References Cited

U.S. PATENT DOCUMENTS

| | | | | |
|---|---|---|---|---|
| 1,427,072 | A | 8/1922 | Dalbey | |
| 1,462,161 | A * | 7/1923 | Balthasar | 116/137 R |
| 1,672,406 | A * | 6/1928 | Burness | 116/142 R |
| 1,746,034 | A * | 2/1930 | Farmer | 116/142 FP |
| 1,941,324 | A * | 12/1933 | Schirmer | 116/137 R |
| 2,181,922 | A * | 12/1939 | Scofield | 340/387.1 |
| 2,694,806 | A * | 11/1954 | Johnson | 340/404.3 |
| 3,516,384 | A * | 6/1970 | Will | 116/137 R |
| 4,050,405 | A | 9/1977 | Palm | |
| 4,075,627 | A | 2/1978 | Pariza | |
| 4,199,752 | A | 4/1980 | Lucas et al. | |
| 4,241,334 | A | 12/1980 | Shintaku | |
| 4,540,975 | A | 9/1985 | Kobayashi | |
| 4,896,134 | A * | 1/1990 | Hayashi | 340/387.1 |
| 4,998,499 | A * | 3/1991 | Nordbeck | 116/142 FP |
| 5,078,074 | A * | 1/1992 | Gomez | 116/137 R |
| 5,270,680 | A | 12/1993 | Lahaye et al. | |
| 5,420,563 | A | 5/1995 | Frigo | |
| 5,517,173 | A | 5/1996 | Cha et al. | |
| 6,211,774 | B1 * | 4/2001 | Steiner | 340/384.7 |
| 6,294,984 | B1 | 9/2001 | Meister | |

FOREIGN PATENT DOCUMENTS

WO WO93/01588 A1 5/1995

* cited by examiner

*Primary Examiner*—R. A. Smith
*Assistant Examiner*—Amy Cohen Johnson
(74) *Attorney, Agent, or Firm*—Plumsea Law Group, LLC

(57) ABSTRACT

A horn assembly is disclosed. The horn assembly includes a shutter than can cooperate with a horn valve. The shutter disposed on an end portion of the horn assembly can help seal the horn assembly and prevent moisture, rain or debris from entering the interior of the horn assembly. In operation, the shutter can be moved to allow the horn to provide a signal. After the horn has completed operation, the shutter can be moved back to its original sealing position.

20 Claims, 4 Drawing Sheets

AUTOMATIC HORN SHUTTER

BACKGROUND OF THE INVENTION

1. Field of the Invention

This invention relates to the field of horns, and more particularly, to a horn suitable for use with a motor vehicle.

2. Related Art

Motor vehicles generally include horns that are designed to provide an audible signal or warning to pedestrians or to other drivers. In some cases, horns are operated by using compressed air.

U.S. Pat. No. 5,517,173 to Cha et al. discloses a horn for an electric car which includes a rotatable shutter (5) disposed in a horn-shaped air collector. A shutter control lever controls the shutter between a closed position and an open position to adjust the loudness or volume of the horn. The fully open position provides the loudest volume setting since the maximum amount of air passes through the air collector to the discharge end. The purpose of the shutter taught by Cha et al. is for sound volume control, and there is no provision for sealing the shutter relative to the air collector. The controller for the shutter of Cha et al. is separate from the horn actuator.

U.S. Pat. No. 6,294,984 to Meister discloses an air horn assembly for mounting on a motorcycle that has a stationary, protective grille or screen (54) to prevent rocks or debris from entering the trumpet. The grill or screen of Meister is stationary and remains fixed during operation of the horn. The grill or screen is also not water tight.

There is currently a need for a system that better protects various components of a horn assembly, while at the same time, does not interfere with the operation of the horn.

SUMMARY OF THE INVENTION

A horn assembly is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a horn assembly for use with a motor vehicle comprising: a horn switch capable of sending a signal to a horn valve; a flared waveguide portion having an air passage; a shutter mechanism, including a shutter, the shutter being associated with the waveguide portion; and wherein the shutter forms a watertight seal against the waveguide portion in a first non-use position.

In another aspect, the shutter mechanism is in communication with the horn switch.

In another aspect, the shutter mechanism acts to displace the shutter to a second position in response to a signal from the horn switch.

In another aspect, the shutter, in the second position, is displaced away from the air passage.

In another aspect, the shutter includes a rubber seal disposed on a surface facing the waveguide portion of the horn assembly.

In another aspect, the shutter is moved to a second position away from the air passage when the horn switch sends a signal to the horn valve.

In another aspect, the shutter is moved back to the first non-use position when the horn switch stops sending a signal to the horn valve.

In another aspect, the invention provides a horn assembly for use with a motor vehicle comprising: a waveguide having an air passage and an opening; a shutter mechanism, including a moving member and a shutter; the shutter having a first position wherein the shutter is disposed over the opening of the waveguide; and the shutter having a second position wherein the shutter is displaced from the first position by a moving member.

In another aspect, the shutter is laterally displaced from the first position.

In another aspect, the moving member is a linear solenoid.

In another aspect, the shutter is rotationally displaced from the first position.

In another aspect, the moving member is a rotational solenoid.

In another aspect, the invention provides a horn system for use with a motor vehicle comprising: a horn switch configured to be actuated by an operator; a horn valve in flow communication with a compressed air supply and a horn assembly; the horn assembly including a shutter mechanism associated with a waveguide; and wherein the horn switch simultaneously sends a signal to the horn valve and the shutter mechanism.

In another aspect, the horn valve places the waveguide in flow communication with a compressed air source in response to the signal from the horn switch.

In another aspect, the shutter mechanism begins to displace a shutter initially aligned with the waveguide in response to the signal from the horn switch.

In another aspect, the horn switch continues to send the signal as long as the horn switch is actuated.

In another aspect, the shutter remains displaced as long as the signal is received.

In another aspect, the shutter begins to return to its original position when the signal is no longer received.

In another aspect, the shutter mechanism provides a watertight seal.

In another aspect, the shutter is disposed downstream of an end portion of the waveguide.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
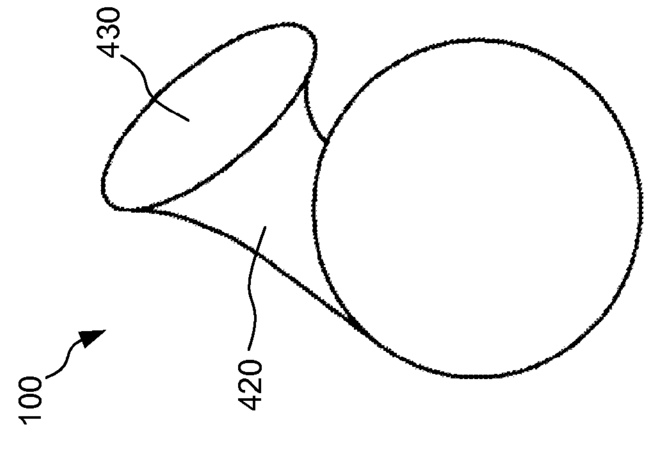
FIG. 1 is a schematic diagram of a preferred embodiment of a horn assembly.
Figure 2:
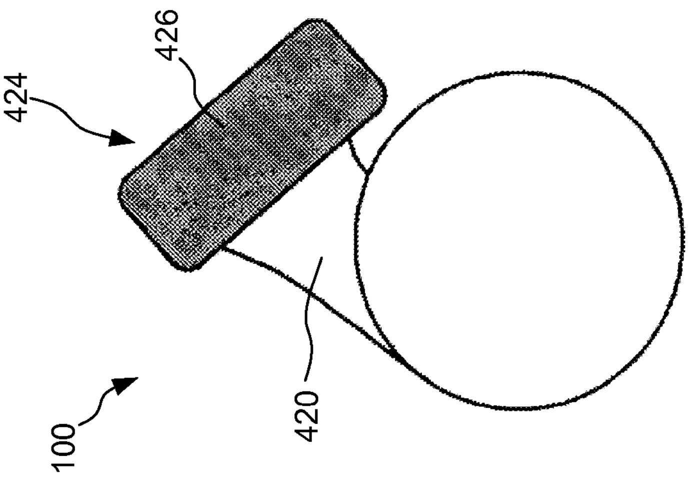
FIG. 2 is a schematic diagram of a preferred embodiment of a horn assembly with a shutter mechanism.
Figure 3:
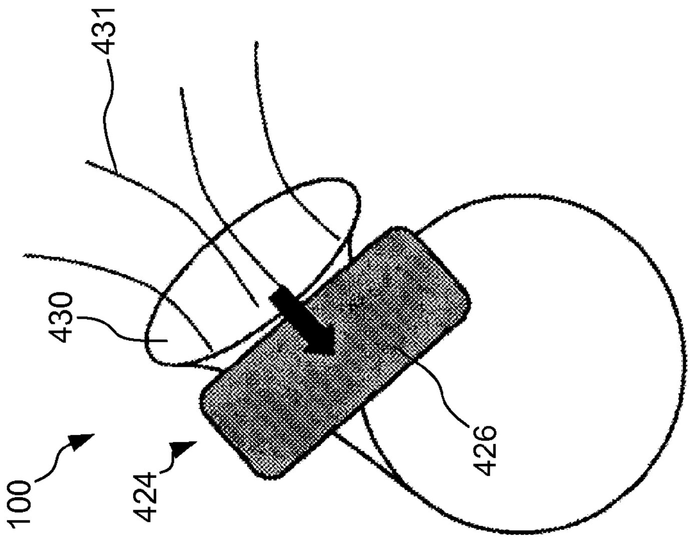
FIG. 3 is a schematic diagram of a horn assembly with a shutter mechanism.

FIGS. 1 to 3 are schematic diagrams of a preferred embodiment of horn assembly 100. Horn assembly 100 preferably includes a waveguide 420. In some embodiments, waveguide 420 is flared. FIG. 2 is a schematic diagram of a preferred embodiment of horn assembly 100 with an associated shutter mechanism 424. In FIG. 2, shutter 426 of shutter mechanism 424 is in a first, non-use position. In this position, shutter 426 is preferably disposed over aperture 430 of waveguide 420. In some embodiments, the surface of shutter 426 that faces waveguide 420 can include provisions to provide a seal.

In some embodiments, these provisions include rubber gaskets and/or rubber seals. In some embodiments, these provisions can provide a watertight seal between shutter 426 and waveguide 420. In those embodiments where a seal is provided, shutter 426 can prevent debris, moisture or rain from entering horn assembly 100. In those embodiments where a seal is not provided, shutter 426 can prevent debris and some moisture or rain from entering horn assembly 100.

In FIG. 3, which is a schematic diagram of a preferred embodiment of horn assembly 100 with an associated shutter mechanism 424, shutter 426 has been moved to a second, operational position. In this second position, shutter 426 is moved or displaced away from aperture 430 and no longer obstructs aperture 430. In this position, horn assembly 100 can be emitting a signal and shutter 426 can allow air stream 431 associated with the signal to exit aperture 430 without being impeded by shutter 426. Preferably, after horn assembly 100 has completed actuation, shutter 426 returns to the first, non-use position.

It can be observed in FIGS. 2 and 3 that shutter 426 can have a dissimilar size and/or shape as aperture 430. In some embodiments, shutter 426 is larger than aperture 430. In some embodiments, shutter 426 is generally rectangular while aperture 430 is generally round. In other embodiments, shutter 426 is similarly sized and shaped as aperture 430. Other sizes and shapes can be substituted for the shapes and sizes shown in FIGS. 2 and 3 and various different combinations can be used.

Figure 4:
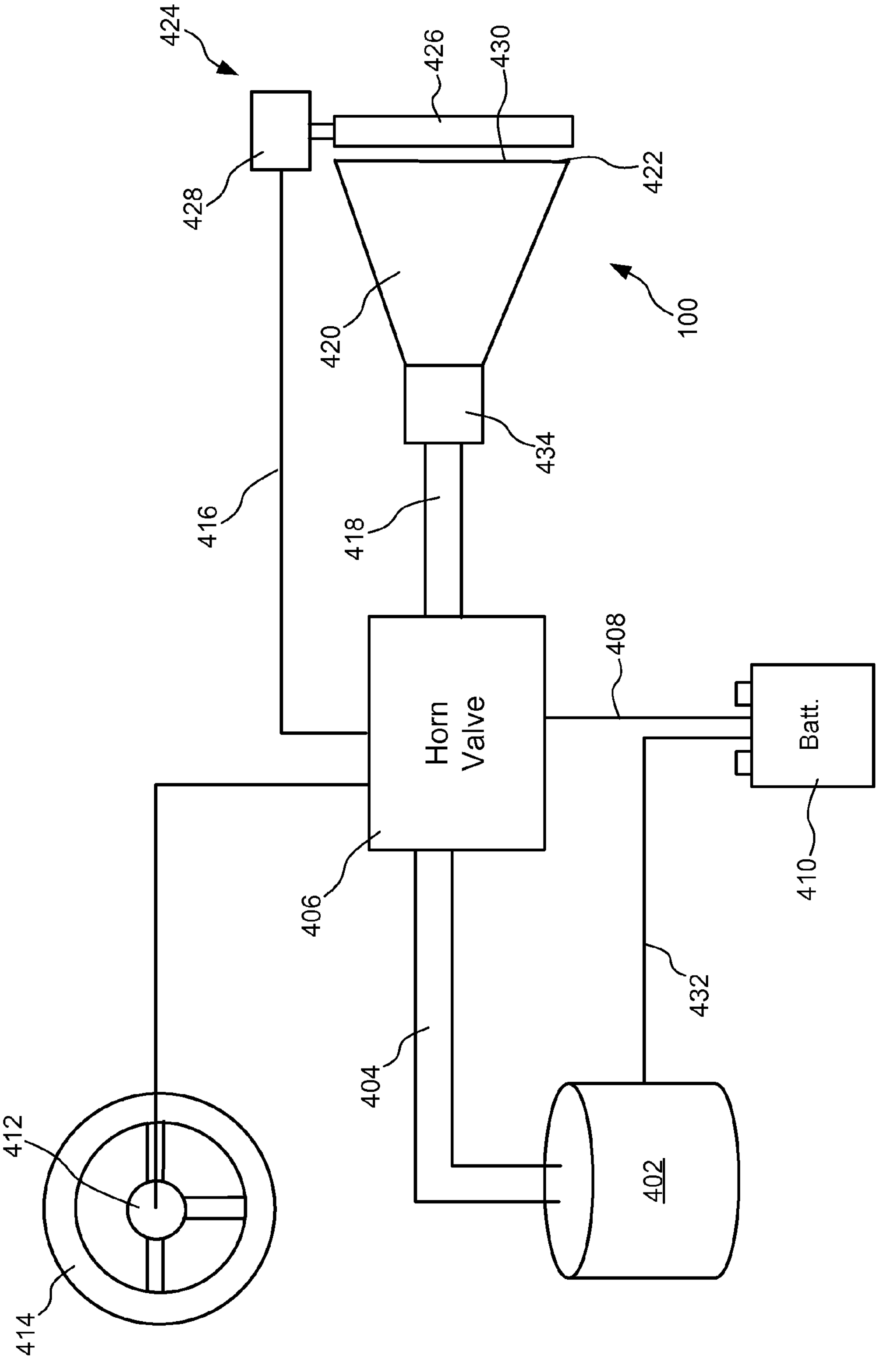
FIG. 4 is a schematic diagram of a preferred embodiment of a horn system.

Some embodiments include provisions to coordinate the operation of shutter 426 with horn assembly 100. Referring to FIG. 4, which is a schematic diagram of a preferred embodiment of horn system 400, the following components can be used to provide an audible signal and to protect horn assembly 100.

Horn system 400 includes compressed air supply 402 in fluid communication with horn valve 406 via first air supply line 404. A battery 410 can be used to provide power to both horn valve 406 and compressed air supply 402. In the embodiment shown in FIG. 4, first power supply line 408 connects battery 410 with horn valve 406 and second power supply line 432 connects battery 410 with compressed air supply 402. Second power supply line 432 can be used to provide power to an air compressor associated with compressed air supply 402.

Horn valve 406 can be actuated with horn switch 412. Horn switch 412 can be located in any convenient location in the passenger cabin of a motor vehicle. In some embodiments horn switch 412 is associated with steering wheel 414. Horn switch 412 can be used to operate horn valve 406.

When acutated, horn valve 406 places compressed air supply 402 in fluid communication with horn assembly 100 via second air supply line 418, which connects horn valve 406 with horn assembly 100. In the embodiment shown in FIG. 4, voice coil 434 associated with horn assembly 100 receives compressed air via second air supply line 418.

Voice coil 434 generates an audible signal that is then directed or amplified by waveguide 420. In some embodiments, voice coil 434 can use compressed air received from compressed air supply 402 to generate an audible signal. The audible signal then emanates from end portion 422 of waveguide 420. In some embodiments, compressed air passing through voice coil 432 will generate an air stream 431 (see FIG. 3) that exits end portion 422 of waveguide 420.

Preferably a shutter mechanism is associated with horn assembly 100 and the shutter mechanism preferably coordinates operation with horn assembly 100. In a preferred embodiment, horn system 400 includes a shutter mechanism 424 associated with horn assembly 100.

Horn mechanism 424 preferably includes a moving member 428 and a shutter 426. A shutter signal line 416 can be used to place shutter mechanism 424 in communication with horn valve 406. Moving member 428 is designed to move shutter 426 away from aperture 430. In a preferred embodiment, moving member 428 displaces shutter 426 when a signal is received from horn valve 406 via shutter signal line 416.

In a preferred embodiment, horn valve 406 sends a signal to moving member 426 via shutter signal line 416 when it is actuated by horn switch 412. This means that horn valve 406 places compressed air supply 402 in fluid communication with horn assembly 100 and at the same time sends a signal to moving member 428 via shutter signal line 416 to displace shutter 426. In a preferred embodiment, horn valve 406 continues to send a signal to moving member 428 as long as horn valve 406 remains open. After horn valve 406 closes, horn valve 406 stops sending a signal to moving member 428. Preferably moving member 428 returns shutter 426 to its original, closed position when no signal is received from horn valve 406.

The operation of horn system 400 can also be described in the following way. Shutter 426 is open—shutter 426 is displaced from aperture 430—when horn valve 406 is open. This means shutter 426 is open when horn assembly 100 is generating an audible signal. In a preferred embodiment, shutter 426 closes or returns to its original position when horn assembly 100 is no longer generating an audible signal.

Figure 6:
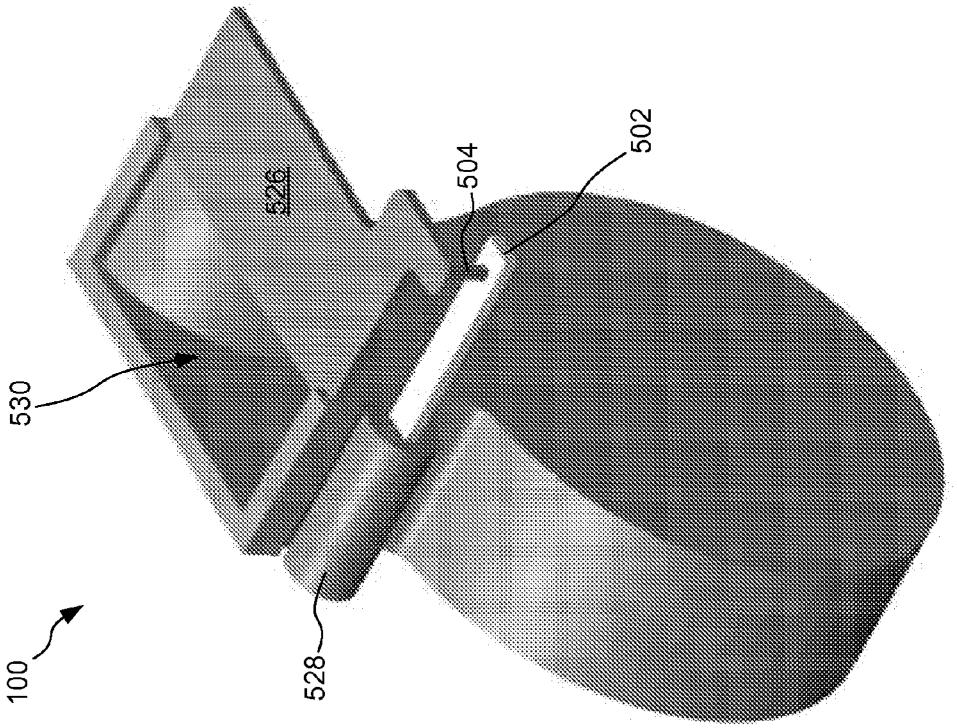
FIG. 6 is a schematic diagram of a preferred embodiment of a horn assembly with a sliding shutter mechanism.
Figure 5:
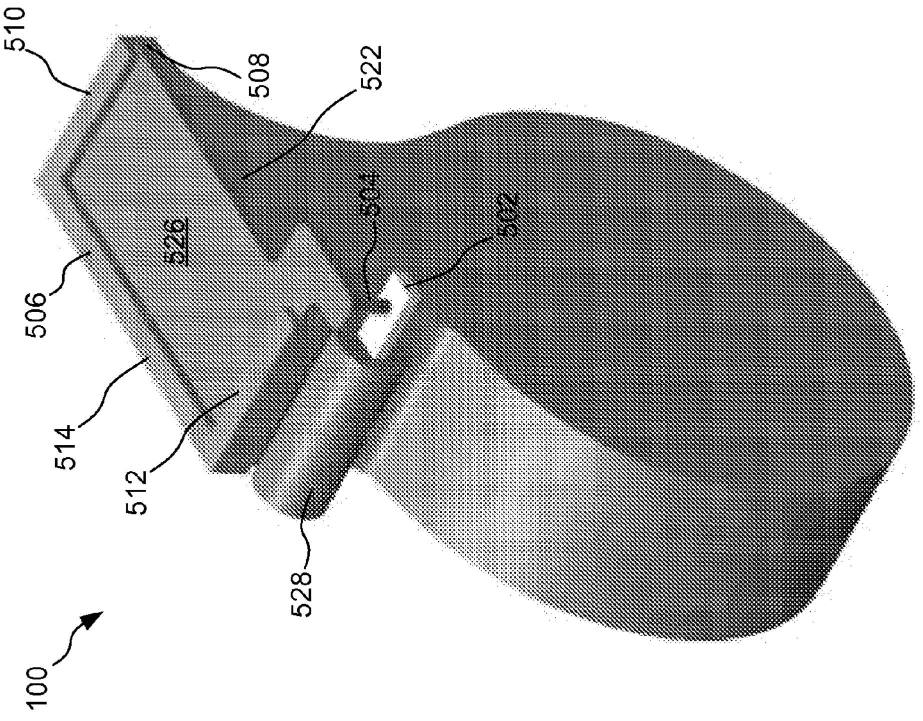
FIG. 5 is a schematic diagram of a preferred embodiment of a horn assembly with a sliding shutter mechanism.

FIGS. 5 and 6 shows a preferred embodiment of horn assembly 100 with a sliding shutter. This sliding shutter arrangement can be considered one embodiment of shutter mechanism 424. In this embodiment, shutter mechanism 424 includes moving member 528. Preferably, moving member 528 is a device that converts an electrical signal into mechanical motion. In the embodiment shown in FIG. 5, moving member 528 is a linear solenoid that cooperates with actuator 502. Shutter 526 is connected to actuator 502 by link 504. Shutter 526 is designed to slide laterally or across the face of aperture 530, or across end portion 522.

In the embodiment shown in FIGS. 5 and 6, a frame 506 is provided proximate to end portion 522. Frame 506 includes a groove 508 which is designed to accommodate shutter 526. Groove 508 can extend around frame 506. Preferably, shutter 526 slides laterally within groove 508 of first lateral portion 510 and second lateral portion 512. First and second lateral portions 510 and 512, respectively, help to guide shutter 526 during its range of motion.

Frame 506 can also include back rail 514 which also preferably includes a groove 508. When shutter 526 is in its first, non-use or closed position, as shown in FIG. 5, a portion of shutter 526 is received in groove 508 of back rail 514.

Preferably a seal is disposed on the side of shutter 526 that faces end portion 522 of horn assembly 100. In the embodiment shown in FIG. 5, the seal will, in some cases, engage groove 508, and in some cases, will engage end portion 522. Preferably, this seal waterproofs horn assembly 100 and prevents rain, moisture or debris from entering into the interior of horn assembly 100.

FIG. 6 shows shutter 526 in an open or actuated position. In this second position, moving member 528 has converted a signal into mechanical motion and has displaced actuator 502 laterally away from horn assembly 100. This, in turn, displaces shutter 526 because shutter 526 is connected to actuator 502 by link 504. In this second open position, it can be observed that shutter 526 generally clears aperture 530 and permits the flow of air stream 431 (see FIG. 3).

Figure 8:
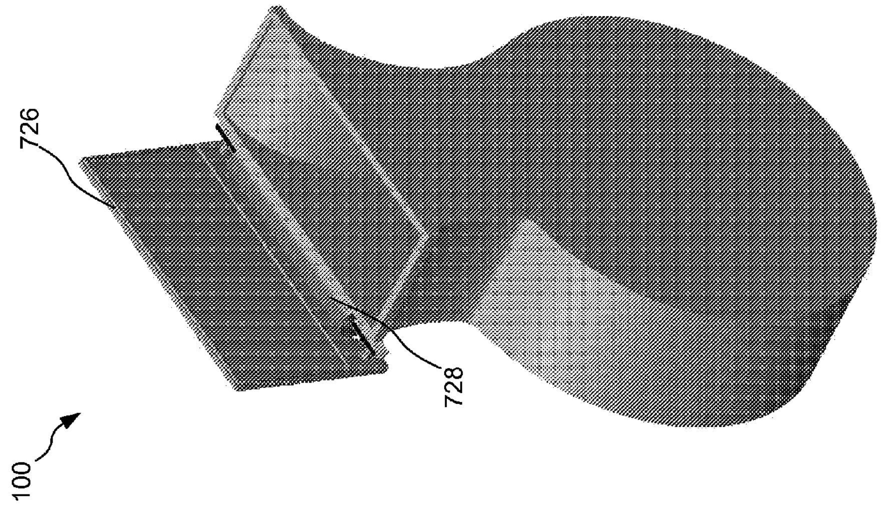
FIG. 8 is a schematic diagram of a preferred embodiment of a horn assembly with a pivoting shutter mechanism.
Figure 7:
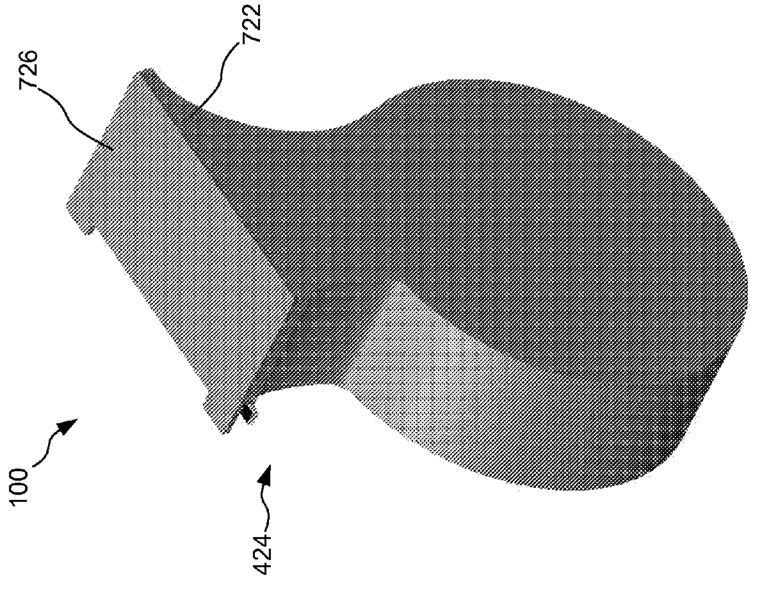
FIG. 7 is a schematic diagram of a preferred embodiment of a horn assembly with a pivoting shutter mechanism.

FIGS. 7 and 8 are schematic diagrams of another preferred embodiment of a shutter mechanism. In this embodiment, shutter mechanism 424 includes moving member 728 disposed proximate end portion 722. Moving member 728 is connected to end portion 722 and shutter 726. Preferably moving member 728 is a rotational solenoid that is configured to rotate shutter 726 from a first non-use position to a second actuated or open position. The first non-use position is shown in FIG. 7 and the second actuated or open position is shown in FIG. 8. Like other embodiments, shutter 726 can include a rubber seal on the surface facing end portion 722. This rubber seal can engage end portion 722 when shutter 726 is in the first, closed or non-use position as shown in FIG. 7. Preferably this rubber seal engages end portion 722 and provides a watertight seal.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A horn assembly for use with a motor vehicle comprising:

a horn switch configured to generate an electric signal;

a shutter mechanism, the shutter mechanism including a shutter actuated by a solenoid;

a horn valve configured to activate a horn;

a flared waveguide portion having an air passage, the waveguide being associated with the shutter; and wherein:

the horn valve is activated by the electric signal and the solenoid of the shutter mechanism is also activated by the electric signal so that the horn valve and the shutter of the shutter mechanism are activated substantially simultaneously; and the shutter forms a watertight seal against the waveguide portion in a first non-use position.

2. The horn assembly according to claim 1, wherein the shutter mechanism includes a solenoid configured to displace the shutter from the first position to a second position.

3. The horn assembly according to claim 1, wherein the solenoid displaces the shutter to the second position in response to the electric signal from the horn switch.

4. The horn assembly according to claim 3, wherein the shutter, in the second position, is displaced away from the air passage.

5. The horn assembly according to claim 1, wherein the shutter includes a rubber seal disposed on a surface facing the waveguide portion of the horn assembly.

6. The horn assembly according to claim 1, wherein the shutter slides laterally to a second position away from the air passage when the horn switch sends the electric signal to the horn valve and the shutter mechanism.

7. The horn assembly according to claim 1, wherein the shutter is moved back to a first non-use position when the horn switch stops sending the electric signal to the horn valve and the shutter mechanism.

8. The horn system according to claim 1, wherein the shutter rotates from a first position to a second position when the shutter mechanism receives the electric signal from the horn switch.

9. A horn assembly for use with a motor vehicle comprising:

a horn switch configured to generate an electric signal;

a horn valve configured to activate a horn;

a waveguide having an air passage and an opening;

a shutter mechanism, including a shutter and a solenoid to displace the shutter;

the shutter having a first position wherein the shutter is disposed over the opening of the waveguide;

the shutter having a second position wherein the shutter is displaced from the first position by the solenoid; and wherein the electric signal, generated by the horn switch, activates both the horn valve and the solenoid so that the horn valve is activated and the shutter is moved by the solenoid substantially simultaneously.

10. The horn assembly according to claim 9, wherein the shutter is laterally displaced from the first position.

11. The horn assembly according to claim 10, wherein the solenoid is a linear solenoid.

12. The horn assembly according to claim 9, wherein the shutter is rotationally displaced from the first position.

13. The horn assembly according to claim 12, wherein the solenoid is a rotational solenoid.

14. A horn system for use with a motor vehicle comprising:

a horn switch configured to be actuated by an operator;

a horn valve in flow communication with a compressed air supply and a horn assembly;

the horn assembly including a shutter mechanism associated with a waveguide;

a shutter guide to receive the shutter and to guide the shutter between a first position and a second position;

wherein the horn switch simultaneously sends a signal to the horn valve and the shutter mechanism; and wherein the shutter guide is a slot in the horn assembly.

15. The horn system according to claim 14, wherein the signal is an electronic signal.

16. The horn system according to claim 14, wherein the shutter moves in a lateral sliding motion from a first position to a second position when the shutter mechanism receives the signal from the horn switch.

17. The horn system according to claim 16, wherein a solenoid is connected to the shutter by an actuator that laterally slides the shutter from the first position to the second position.

18. The horn system according to claim 14, wherein the first position is a closed position and the second position is an open position.

19. The horn system according to claim 14, further comprising a shutter seat including a groove to receive the shutter and form a watertight seal when the shutter is in a closed position.

20. The horn system according to claim 14, wherein: the shutter has a lip that extends over and around the waveguide to seal the horn assembly when the shutter is over the horn.

* * * * *